July 23, 1957 A. J. LARRECQ ET AL 2,799,988
CATAPULT DEVICE
Filed June 8, 1953 4 Sheets-Sheet 1
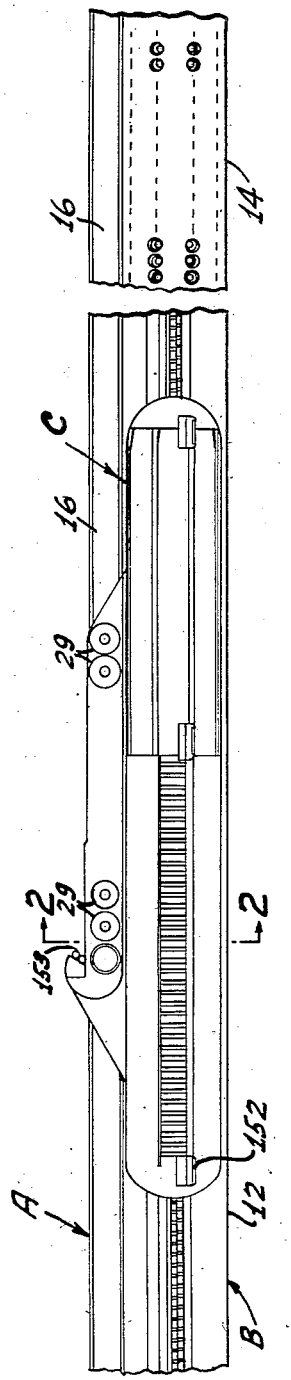
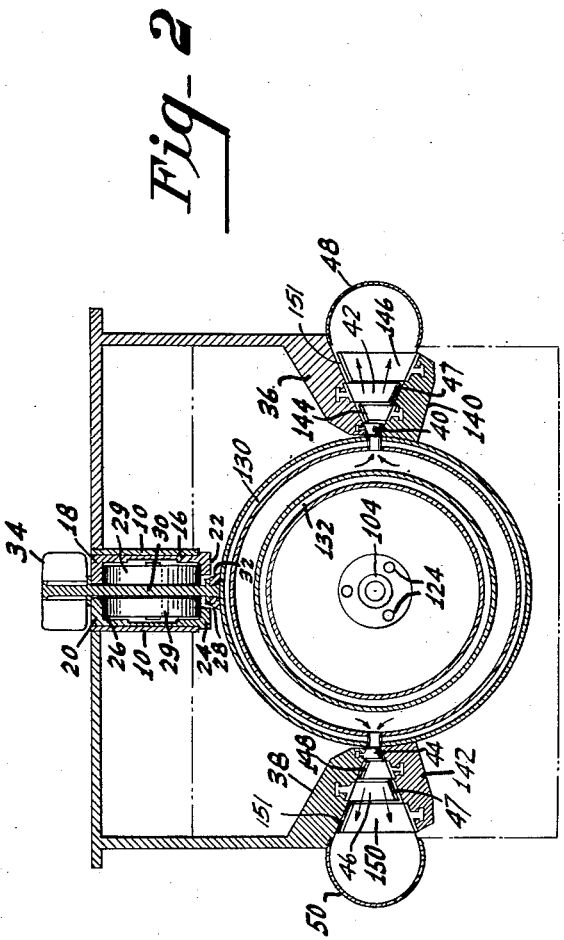
INVENTORS-
ANTHONY J. LARRECQ,
RALPH S. LYNCH, AND
GREGORY P. CUSHING
BY
Harry Sangram
ATTORNEY July 23, 1957     A. J. LARRECQ ET AL     2,799,988
CATAPULT DEVICE Filed June 8, 1953                                          4 Sheets-Sheet 2

INVENTORS-
ANTHONY J. LARRECQ,
RALPH S. LYNCH, AND
GREGORY P. CUSHING
BY
Harry Langsam
ATTORNEY INVENTORS-
ANTHONY J. LARRECQ,
RALPH S. LYNCH, AND
GREGORY P. CUSHING
BY
Harry Sangsan
ATTORNEY July 23, 1957  A. J. LARRECQ ET AL  2,799,988
CATAPULT DEVICE
Filed June 8, 1953  4 Sheets-Sheet 4
*Fig 7*
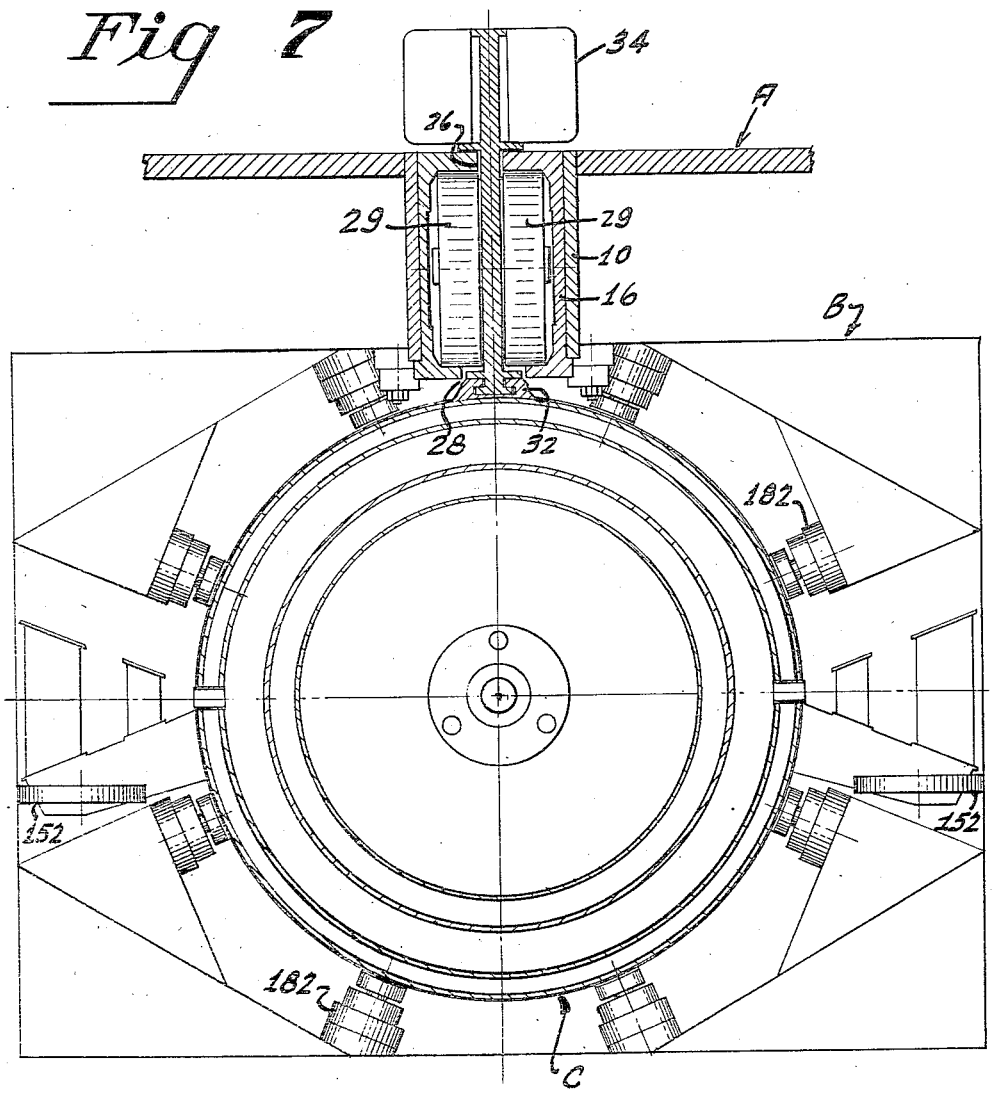
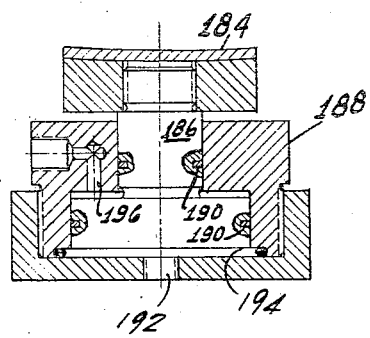
*Fig. 8*
INVENTORS-
ANTHONY J. LARRECQ,
RALPH S. LYNCH, AND
GREGORY P. CUSHING
BY
Harry Langram
ATTORNEY

United States Patent Office 2,799,988
Patented July 23, 1957

2,799,988

CATAPULT DEVICE

Anthony J. Larrecq, Yardley, Pa., and Ralph S. Lynch and Gregory P. Cushing, Trenton, N. J., assignors to Power Generators Limited, Trenton, N. J., a corporation of California Application June 8, 1953, Serial No. 359,994

2 Claims. (Cl. 60—35.6)

This invention relates to a catapult device for launching aircraft, guided missiles and the like, and particularly relates to a reaction type catapult wherein the reaction of a fluid, such as a combustion gas, passing through a turbine system is utilized to provide the propulsive energy.

There have, heretofore, been many attempts to provide an effective and yet easily operable launching device for aircraft and the like, and numerous devices have been produced which have had varying degrees of success. Some of these devices have utilized a system of cables or linkages. Others have utilized a shuttle or piston having a load-engaging hook extending therefrom, this shuttle being propelled through a tube by the propulsive force of gases produced by the combustion of a propellant mixture, the hook extending through a slot in the tube, and a sealing device acting to close the slot after the shuttle has passed through. Still others have even used some form of turbine construction.

However, the strength limitations of cables and the like at high loads and velocities are quite obvious, while the slotted tube arrangement is concerned with the problem of providing an adequate sealing means for the slot, a problem which has, to this date, never been satisfactorily solved. Insofar as the previous turbine type catapults are concerned, they have all been of a comparatively primitive construction, leaving many problems unsolved, and none of them has ever achieved the necessary operability required for effective use. Such a degree of operability plus many other important advantages, as will hereinafter appear, have been achieved by this invention.

In this invention, propulsion is obtained by utilizing the reaction of a fluid, such as a combustion gas, which is made to pass through a series of radial, linearly arranged nozzles on a launching shuttle or carriage, and thence through a linear turbine blading system. The blading system generally comprises a series of movable blades provided longitudinally of the carriage, and a series of stationary blades provided longitudinally of the track on which the carriage makes its run.

The high kinetic energy of the exhaust gases from the reaction-type power plant is utilized to augment the thrust of the carriage resulting in an increase in efficiency over comparable reaction devices such as conventional rocket motors. The power plant is provided within the carriage itself which, in this way, comprises a self-sufficient unit, free from any dependence upon stationary launching connections. This independence is highly desirable in that it reduces the need for complex and bulky connecting apparatus, it prevents high speed rubbing or sliding friction between stationary and moving parts with the incident increase in wear and decrease in efficiency, and it allows rapid catapult operation since the expended carriage can be removed and a preloaded carriage quickly substituted therefor between runs. These preloaded units can be made up at the factory or at the launching installation long before their use is required and can then be stored out of the way but ready for instant use when needed.

In the reaction type of catapult with which this invention is concerned, the efficiency of operation is improved in direct proportion to the increase in velocity of the launching means. As launching speeds are raised, the propulsion efficiency is increased almost linearly as the gases flowing from the nozzles on the carriage and through the blading provide increasing work. This is in marked contrast to the existing non-reaction type catapults where the efficiency decreases with the increase of velocity. Future catapult considerations indicate that higher launching speeds and energies are a prime requirement for increased performance of aircraft of advanced design. The value of this invention is, therefore, self-evident since the performance of the catapult improves with increasing velocity. It is, indeed, capable of generating virtually unlimited amounts of energy due to the fact that it is a velocity compounded device where the increasing change of pressure into velocity provides an increasing change of potential into kinetic energy.

Another feature of this invention is the permissible variation in launching stroke. This stroke can be varied by the addition or removal of stationary blading sections on the track or by using only part of the existing track length. In contrast, conventional catapults generally have well defined strokes and changes become impractical. This variable launching stroke provides considerable versatility since a heavy load can be launched at low acceleration and long stroke while a light load can be launched at high acceleration and short stroke with the same equipment and propulsion thrust. This type of construction also permits the catapult to be started from an infinite variety of positions along the track whereby there may easily be obtained a decrease in the launching stroke while keeping the arresting engines at a fixed location. A variable starting position may also be desirable if damage has occurred to a portion of the launching track, particularly the starting sections. This is a great improvement over the conventional type of catapult where the carriage or piston must begin its run from a fixed position.

The particular embodiment of the invention illustrated here comprises a combustion system utilizing the combustion of a liquid petroleum fuel and compressed air. Although it is possible within the scope of this invention to use other propellant means such as solid or liquid monofuels or bifuels, these other propellant means all have disadvantages which are not present in the illustrated device.

The monofuels are, in most cases, subject to sudden release of energy due to an inadvertent temperature rise, shock or contact with some impurity which may get into the propellant chamber and act as an involuntary catalytic agent. It is, furthermore, difficult to prepare a monofuel having the correct controllable rate of decomposition and evolution of heat, and when such a fuel is prepared, it can be used only for very carefully predetermined conditions. In the case of a solid propellant charge, where there is even a slight variation in launching weight, velocity or acceleration, a differently designed charge must be used. This results in obvious inflexibility of operation and the necessary storage of large numbers of catapult charges. In the case of a liquid monofuel propellant, there must be maintained a relatively constant viscosity under a wide range of conditions. Furthermore, the pressures must be closely controlled, with flows varying according to rigid standards, and this control is further complicated because pressure losses in the pumping systems increase with the square of flow.

Insofar as regards the ordinary bifuels, there is generally a spontaneous ignition when the fuel and oxidant are mixed. This prevents the safe control of combustion. In addition, these fuels are in most cases, extremely difficult to handle, ship or store, since they are generally easily combustible, highly corrosive and chemically unstable.

It is, therefore, one object of this invention to provide a catapult device wherein the launching carriage has a self-contained power plant and is free of any stationary launching connections.

Another object of this invention is to provide a catapult device wherein the propulsion efficiency is increased with increased velocity.

Another object of this invention is to provide a catapult device wherein it is possible to easily vary the launching stroke.

Another object of this invention is to provide a catapult device wherein the catapult launching means can be started from an infinite variety of positions along the length of the launching track.

Another object of this invention is to provide a catapult device wherein there is provided an essentially constant flow of propulsive media throughout launching.

Another object of this invention is to provide a catapult device wherein the launching force is augmented by the flow of the combustion gases from a reaction type power plant as they pass through a turbine system.

Other objects of this invention are to provide an improved catapult device of the character described, which is relatively simple in construction, which is easily and economically produced, which is sturdy in construction, and which is highly efficient in operation.

With the above and related objects in view, the invention consists in the details of construction and combination of parts, as will be more fully understood from the following description, when read in conjunction with the accompanying drawings in which:

Fig. 1 is a side view of the catapult device with one side of the track removed.

Fig. 2 is a cross-sectional view taken on the line 2—2 of Fig. 1.

Fig. 3 is a longitudinal sectional view of the carriage in position on the track.

Fig. 7 is a cross-sectional view of the braking section of the catapult, and showing a cross-sectional view of the carriage therein.

Fig. 8 is a sectional view of one of the braking shoes.

Referring now in greater detail to the drawings wherein similar reference characters refer to similar parts, there is shown a catapult platform A underneath which is located a catapult track B on which is adapted to ride a catapult launching shuttle C.

Figure 4:
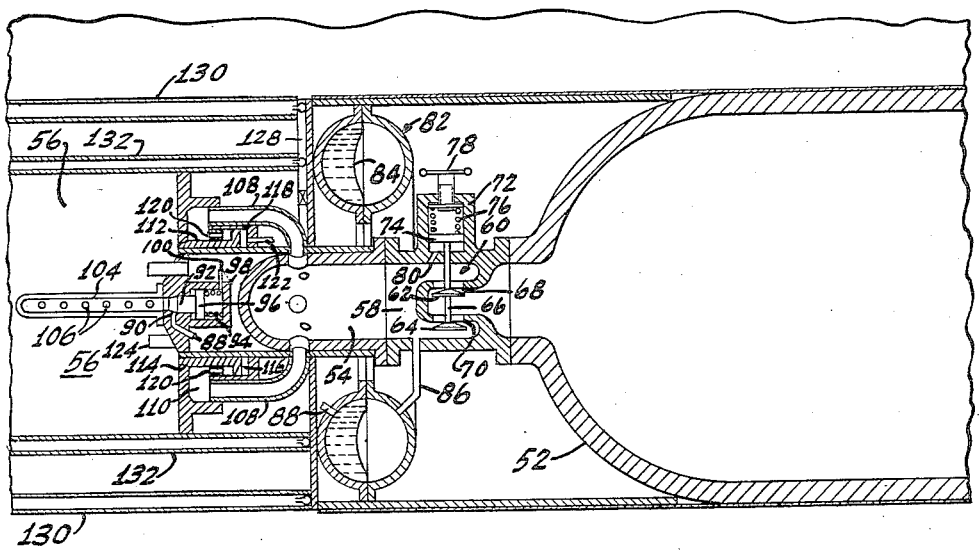
Fig. 4 is an enlarged sectional view of a portion of the carriage taken on line 4—4 of Fig. 3.

The platform A may be the deck of an aircraft carrier, a land-based ramp or any similar device. A longitudinal slot is formed in the platform and fixed in any conventional manner within this slot are a pair of parallel walls 10. These walls 10 extend between the platform A and a longitudinal slot in the track B to which they are also fixed in any conventional manner.

The track B comprises an elongated, hollow fixture which is illustrated as being generally rectangular in cross-section, although such configuration is not necessarily limiting and others may be used within the scope of the invention. This track consists of a launching section generally designated 12 and a braking section generally designated 14. A channel member 16, located between the walls 10, is fixed to the track and to the platform, this channel member including a pair of overhead rails 18 and 20, and an underside pair of rails 22 and 24. Formed between the rails 18 and 20 is a slot 26 and formed between the rails 22 and 24 is a slot 28.

Adapted to ride in the channel member 16 are a plurality of rollers 29 rotatably mounted on a stem 30 which extends through the slot 28 and is fixed in a socket 32 on the carriage C. The stem 30 also extends through the slot 26 and is provided on the top thereof with a load engaging hook 34.

Extending inwardly from opposite sides of the section 12 of track B are a pair of supports 36 and 38, these supports extending substantially the full length of the section. Fixed in the support 36 are two rows of linearly arranged turbine blades 40 and 42 and fixed in the support 38 are two rows of linearly arranged turbine blades 44 and 46. Each blade is provided with a shroud 47. Although two rows of blades on each side are illustrated here, it is nevertheless, entirely within the scope of this invention to provide either one row or more than two rows on each side, as will hereinafter more clearly appear. Elongated chambers 48 and 50 are provided on opposite walls of the track outwardly of the blades and in alignment therewith, these chambers being provided with ducts, not shown, leading to atmosphere. The carriage C comprises a closed, hollow, generally cylindrical body within which there is provided a closed compartment 52 adapted to hold fluid under pressure. This fluid is illustrated as compressed air, although the invention is not limited to this particular fluid, others being acceptable for the purpose. A conduit 54 connects the compartment 52 to a combustion chamber 56, and interposed in this conduit is a regulator valve chamber 58 in which is provided a pressure regulator valve 60. The regulator valve 60 may be of any ordinary type, since regulator valves, per se, are common and the particular valve, by itself, forms no part of the invention. However, merely to illustrate the invention, the valve 60 is shown as comprising a pair of valve heads 62 and 64 coaxially fixed on a stem 66 and adaptd to respectively move toward and away from seats 68 and 70. The valve stem 60 extends through an opening in the valve chamber 58 into a chamber 72. A piston head 74 is formed on the end of stem 66 within chamber 72 and is biased downwardly, as viewed in Fig. 4, by a spring 76. The tension of the spring 76 is adjustable by means of the manually actuatable member 78. Bleed openings 80 connect the valve chamber 58 to the chamber 72.

Surrounding the conduit 54 is an annular compartment 82 for holding fuel. The particular shape of the fuel compartment is not limited to that illustrated here but may take any one of a number of various shapes. This compartment 82 is divided into two separate sections by a pressure responsive member. The pressure responsive member may take any one of a variety of forms such as a movable piston or the like. It is, however, here illustrated as a flexible, annular diaphragm 84 dividing the compartment into two sections. A conduit 86 leads from the downstream end of valve chamber 58 into one section of the annular compartment 82. The other section is adapted to hold liquid fuel, preferably of the petroleum type, and is provided with an outlet conduit 88 which extends into a position adjacent a valve seat 90. A valve 92 is biased toward seat 90 by a spring 94 acting on a piston head 96 attached to the valve within a chamber 98. A tube 100 leads from chamber 98 to a solenoid-operated three-way valve 102, illustrated in Fig. 5, which is adapted to be connected to atmosphere or to the pressure system. Projecting into the combustion chamber from the valve seat 90 is a nozzle 104 having a plurality of spray orifices 106 thereon.

The conduit 54 is connected to the combustion chamber by a plurality of pipes 108 which lead into an annular valve chamber 110. Slidable in the valve chamber 110 is a sleeve valve 112 which is adapted to close against an annular valve seat 114. The valve 112 is provided with a head 116 which is positioned within a chamber 118. A plurality of orifices 120 connect the chamber 110 with the chamber 118 and a duct 122 leads from the chamber 118 to the three-way valve 102.

Figure 5:
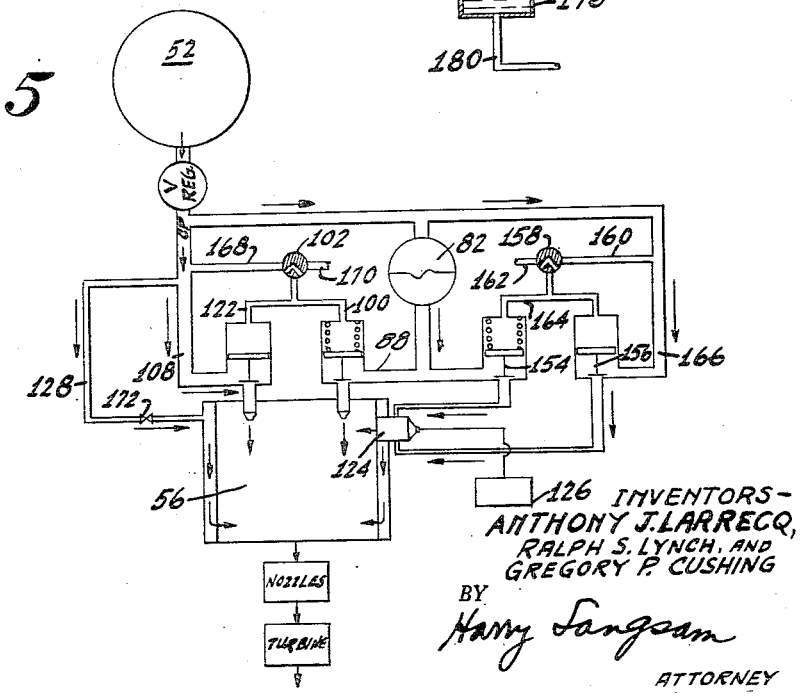
Fig. 5 is a schematic diagram showing the fluid system and its allied parts.

A plurality of igniting devices 124, illustrated here as being of the torch type, although other kinds may be used, surround the nozzle 104 within the combustion chamber, these igniting devices being connected to an ignition source as illustrated at 126 in Fig. 5. This source may comprise spark plug coils or any other similar means and this, in turn, may be connected to a source of electrical energy, such as a battery, either mounted directly on the carriage or remote therefrom and having a breakable wire connection with the ignition source.

Extending from the conduit 54 adjacent the pipes 108 are a second group of pipes 128. These pipes connect with spaced annular conduits 130 and 132 on the periphery of the combustion chamber. These conduits form what amounts to a double wall for the combustion chamber and have orifices opening into one end of the chamber as illustrated at 134 and 136.

Provided on opposite sides of the outer wall of the combustion chamber are a plurality of linearly arranged openings or nozzles 138, having the passages extending angularly toward the rear of the carriage. These nozzles, which are of the well-known expanding type, are in general alignment with a plurality of linearly arranged turbine blades supported on either side of the carriage by the elongated support members 140 and 142, these support members being attached to the carriage. Although the number of rows of blades is variable within the scope of the invention, two rows of blades are shown on each support member as at 144 and 146 and at 148 and 150. Each blade is provided with a shroud 151. It should be noted that the curvature of the blades on the carriage is opposite that of the blades on the track. It should also be noted that mounted at intervals along the length of the support members 140 and 142 are laterally positioned rollers 152 which are adapted to move along the side walls of the track to guide the carriage during its movement.

The operation of the device is as follows: When the catapult is to be put into operation, the carriage C is placed in position, the aircraft or other load attached and secured to the hook, as by a cable 153, and pretensioned. Following assurance of readiness, the power plant is fired. The reaction thrust disengages the load from the detention means, and the velocity of the load is raised to a predetermined launching value, at which time the power plant is shut off and the load continues in free flight while the carriage is arrested to zero velocity.

The firing is accomplished through a control panel, not shown, but of any ordinary type generally used for the purpose. First, a switch on the control panel is actuated to fire the ignition system to create a flame in the combustion chamber. This ignition system is schematically illustrated in Fig. 5 and includes a fuel valve 154, of the same general type as the fuel valve 92, and an air valve 156 of the same general type as the valve 112. It should here be noted that the spring 94 of the valve 92, as well as the spring of the valve 154, are useful only during the low pressure stage when the valves are closed. Their purpose is to positively seat the valves to prevent any seepage of fuel therethrough.

The respective valve chambers of the valves 154 and 156 are connected to the solenoid-operated three-way valve 158. This valve 158 is adapted to connect the valve chambers either to the pressure fluid line through conduit 160 or to atmosphere as at 162. When the ignition system is fired, the solenoid valve 158 is moved to its venting position and bleeds air from behind the two valves. The pressurized fuel from conduit 164 then opens the valve 154 and the pressure fluid from conduit 166 opens the valve 156. The mixture of fuel and air is then ignited by the spark plugs or the like to provide a flame at the flame holders 124.

After the ignition system has been fired, a second switch on the control panel is actuated to fire the main combustion system. When this switch is actuated, it moves the solenoid valve 102 from the position wherein it connects the rear of the fuel and pressure fluid valve chambers 98 and 118 to the pressure fluid line through conduit 168 to the position wherein it vents the chambers to atmosphere as at 170. The pressurized fuel from conduit 88 then acts to open the fuel valve 92 and the compressed air from conduit 108 acts to open the pressure fluid valve 112. The compressed air and liquid fuel enter the combustion chamber, are atomized, mixed and ignited by the flame from the ignition means.

After combustion takes place in the combustion chamber, the hot gases formed thereby flow out between the double walls formed by the annular conduits 130 and 132 and out through the nozzles 138. These gases, leaving the chamber radially, are then redirected to a forward direction through the stationary turbine blades 40 and 44 fixed to the track and impinge on the moving turbine blades 144 and 148 mounted on the carriage. As the gases are redirected to a rearward direction through the moving blades 144 and 148, considerable propulsive thrust is gained through utilization of the kinetic energy of the gases. The redirection of the gases to a forward direction through the second series of stationary blades 42 and 46 to a rearward direction through moving blades 146 and 150 results in a further increase in thrust. It is anticipated that two sets of fixed blades and two sets of moving blades will be used, although the number of stages may obviously be varied. It is further anticipated that the gases will leave radially from opposite sides of the carriage, permitting good utilization of areas and balance of radial reactive forces.

In order to cool the combustion chamber where the process of combustion creates enormous temperatures, and also in order to cool the hot gases flowing into the turbine section, a coolant system is provided which is here illustrated to comprise the annular ducts 130 and 132 which are connected to the conduit 54 by a plurality of pipes 128. A solenoid valve 172 is interposed in the line, this valve being adapted to be opened at firing of the main system. The orifices 134 and 136 in the ducts allow the compressed air, which, by circulating through the ducts, act to cool the combustion chamber, to pass out and mix with the combustion gases. This not only provides a more complete combustion of the combustible material but also acts to cool the exhaust gases. These exhaust gases are further cooled during their passage between the ducts so that by the time they reach the nozzles they are of a temperature which is not high enough to cause any appreciable thermal damage to the apparatus but are yet high enough to be efficient. In addition, this excess air operation insures clean and safe products of combustion and completely eliminates the dangers of afterburning or explosion of exhaust products.

Figure 6:
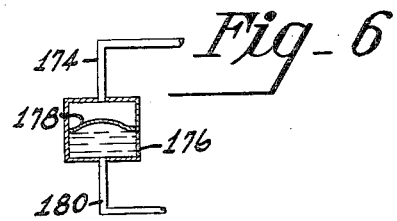
Fig. 6 is a schematic view of a modification in the system illustrated in Fig. 5.

Although a system of air cooling has been described above, various other methods may be substituted therefor. For example, water or other liquid cooling may be used, and one manner in which this can easily be done is to interpose a water tank in the line 128 with the tank separated into two compartments by a diaphragm in the manner of the fuel tank illustrated in the drawings. Water or other coolant may be provided at one side of the diaphragm and the compressed air may be admitted to the other side thereof to place the liquid under pressure. This modification is illustrated in Fig. 6 where the conduit 174, similar to conduit 128 and interposed in the same system, is provided with a tank 176 having a diaphragm 178 therein, and wherein a conduit 180 leads from the tank toward the walls of the combustion chamber.

It should here be noted that in any of the systems of cooling, the outlets from the annular coolant ducts may be eliminated entirely. In this way the cooling of the critical parts of the apparatus can be accomplished exclusively without cooling the exhaust products. This would provide the high efficiency concurrent with high temperature while substantially protecting the critical parts from thermal damage. However, the complete combustion obtained by the other method would not be possible in this way, unless additional means for accomplishing this purpose were provided.

In the velocity compounding with the blading system of this invention, the gases are discharged from the nozzles and pass through the blades at substantially atmospheric pressure. This reduces the requirements for close clearance between fixed and moving blades and reduces the effects of leakage.

Power plant operation continues, although the ignitors may be shut off following initiation of catapult launch, until the end of catapult stroke at which time the combustion is discontinued by closing of the valves or by exhaustion of the propellants within the carriage.

If at any time during launch, it appears desirable to discontinue operation, as in the case of a runaway shot, where the launching load is lost, the power plant can easily and quickly be shut off following receipt of a signal from a suitable actuation device which senses any extraordinary conditions.

Arresting of the carriage can be accomplished by a variety of standard methods or by a high speed, dry friction braking system such as illustrated in Figs. 7 and 8. In this installation, a series of stationary friction brake means 182 are provided on the track radially to the axis of the carriage. These brake means are located in the braking section 14 of the catapult and each consists of a friction head 184 mounted on a piston 186 movable in a housing 188. Sealing rings 190 are provided on the piston. A passage 192, connected to a source of fluid pressure, is provided in the housing and extends beneath face 194 on the piston. A fluid conduit for venting and counter-balancing purposes is shown at 196. The brake shoes are stationary and are positioned to be frictionally applied against the periphery of the carriage as it passes by. The shoes are, in this manner, under a constant fluid pressure.

Although this invention has been described in considerable detail, such description is intended as being illustrative rather than limiting, since the invention may be variously embodied, and the scope of the invention is to be determined as claimed.

What is claimed as the invention is:

1. A projectile for use in a catapult device comprising a hollow, generally cylindrical body having therein a reaction-type powerplant and exhaust means therefor, said powerplant consisting of a first compartment for holding a fluid under pressure, a second compartment for holding a liquid fuel, said second compartment being characterized by a diaphragm therein for dividing said compartment into two sections, a first conduit extending between said first compartment and that section of said second compartment which lies to one side of said diaphragm, a second conduit extending from that section which lies to the other side of said diaphragm into a combustion chamber, a third conduit extending between said first compartment and said combustion chamber, means to normally close the passages between said second conduit and said combustion chamber and between said third conduit and said combustion chamber, other means to actuate said first mentioned means to open said passages simultaneously, and means in said combustion chamber for igniting a combustible mixture.

2. The apparatus of claim 1 wherein said exhaust means comprises a plurality of linearly arranged nozzles on the outer surface of said projectile, said nozzles being spaced from one another longitudinally of said projectile and each having a passage therethrough leading from said combustion chamber, and a plurality of linearly arranged turbine blades supported by said projectile radially outwardly of said nozzles, said turbine blades being generally aligned with said nozzles.

References Cited in the file of this patent
UNITED STATES PATENTS

| | | |
|---|---|---|
| 798,855 | Wentworth | Sept. 5, 1905 |
| 1,997,945 | Oloszy | Apr. 16, 1935 |
| 2,202,449 | Fleet et al. | May 28, 1940 |
| 2,240,947 | Wilson | May 6, 1941 |
| 2,244,467 | Lysholm | June 3, 1941 |
| 2,380,105 | Gerrard | July 10, 1945 |
| 2,395,405 | Goddard | Feb. 26, 1946 |
| 2,484,230 | Jones | Oct. 11, 1949 |
| 2,493,013 | Nelson | Jan. 3, 1950 |
| 2,514,406 | Maxson | July 11, 1950 |
| 2,606,725 | Dreibelbis | Aug. 12, 1952 |
| 2,717,744 | Birnbaum | Sept. 13, 1955 |

FOREIGN PATENTS

| | | |
|---|---|---|
| 949,489 | France | Feb. 21, 1949 |